United States Patent [19]

Bixler et al.

[11] Patent Number: 4,924,813
[45] Date of Patent: May 15, 1990

[54] PORTABLE CORRAL

[76] Inventors: Dickie R. Bixler, Rte. 1, Box 33, Dacoma, Okla. 73731; Phillip R. Sutter, 1111 Jester, Fairview, Okla. 73737

[21] Appl. No.: 327,260

[22] Filed: Mar. 22, 1989

[51] Int. Cl.[5] .............................................. A01K 29/00
[52] U.S. Cl. ........................................ 119/82; 119/20
[58] Field of Search ................... 119/20, 82, 98, 99, 119/155, 96

[56] References Cited

U.S. PATENT DOCUMENTS

| | | |
|---|---|---|
| 286,575 | 10/1882 | Barnes . |
| 430,426 | 6/1890 | Hammond . |
| 449,228 | 3/1891 | Myers et al. . |
| 753,833 | 3/1904 | Copley . |
| 880,665 | 3/1908 | Hopper . |
| 2,228,946 | 1/1941 | Carter . |
| 3,420,211 | 1/1969 | Hartrickson .................... 119/82 |
| 3,545,407 | 12/1970 | Moore .............................. 119/155 |
| 3,702,600 | 11/1972 | Bright et al. ..................... 119/82 |
| 3,921,585 | 11/1975 | Hall .................................... 119/20 |
| 3,929,104 | 12/1975 | Corbin ............................... 119/99 |
| 4,034,716 | 7/1977 | Fleming ............................ 119/82 |
| 4,366,775 | 1/1983 | Tyquin ............................... 119/82 |
| 4,537,151 | 8/1985 | Bolton ............................... 119/20 |
| 4,569,309 | 2/1986 | Wilson ............................... 119/20 |
| 4,619,223 | 10/1986 | Koehn ............................... 119/20 |

FOREIGN PATENT DOCUMENTS 685245 9/1979 U.S.S.R. .............................. 119/82

Primary Examiner—John Weiss
Attorney, Agent, or Firm—Head & Johnson

[57] ABSTRACT

This is a portable loader for cattle, sheep and so forth and is to be pulled behind a truck. It include a loading chute having a ramp and sides and two trailing fence sides, each divided into two or more panel sections. The ramp and each section is provided with wheels so that they can be pulled down the highway with the two side fences parallel and close together. When it is desired to use the portable loader the pulling truck stops and backs up. This backing up causes the two fence sides to extend or bulge outwardly forming a pen. The end sections of each side can flare outwardly to form a chute for driving the cattle through and into the enclosure and these end sections can be folded together to form a closed gate for the enclosure.

7 Claims, 5 Drawing Sheets

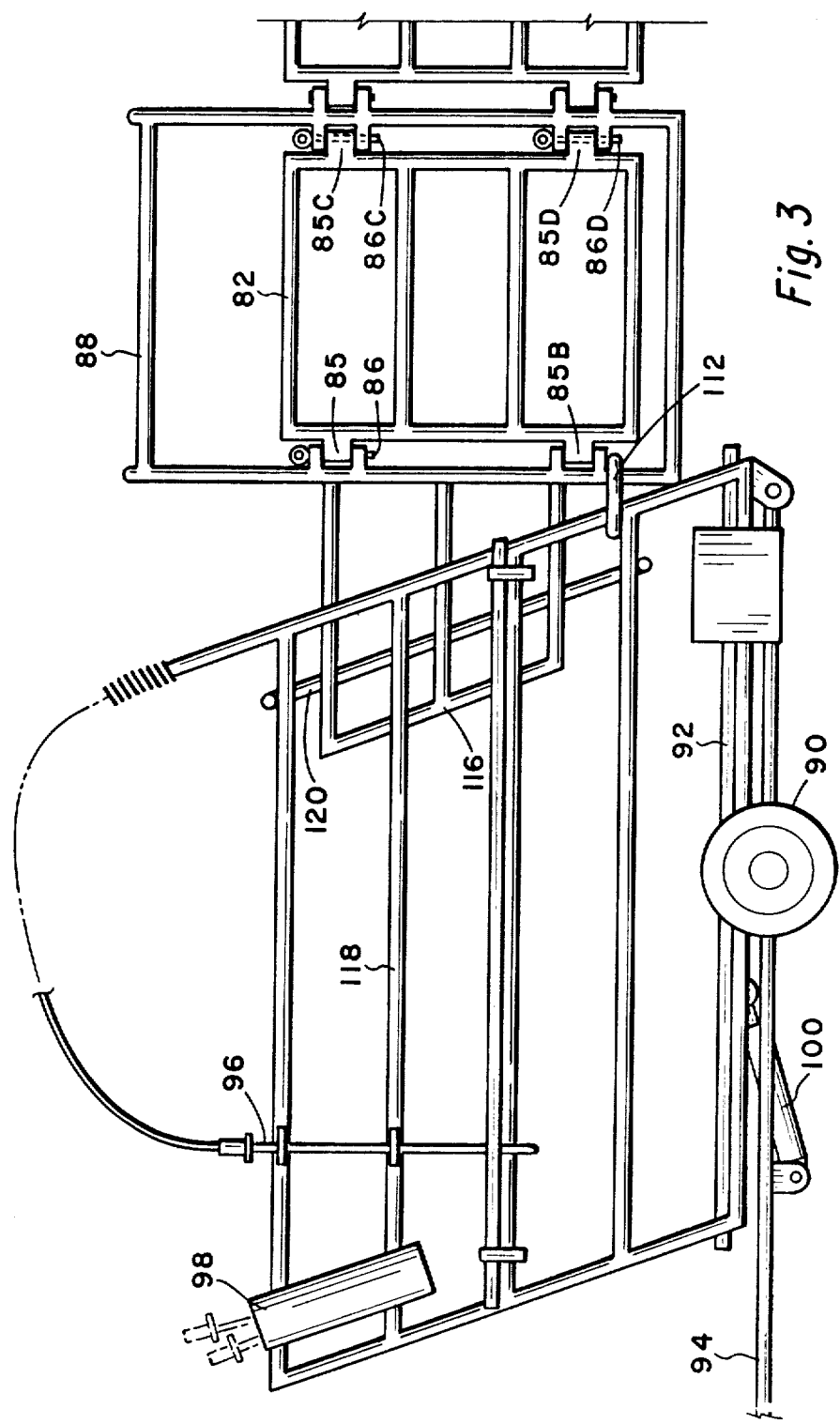

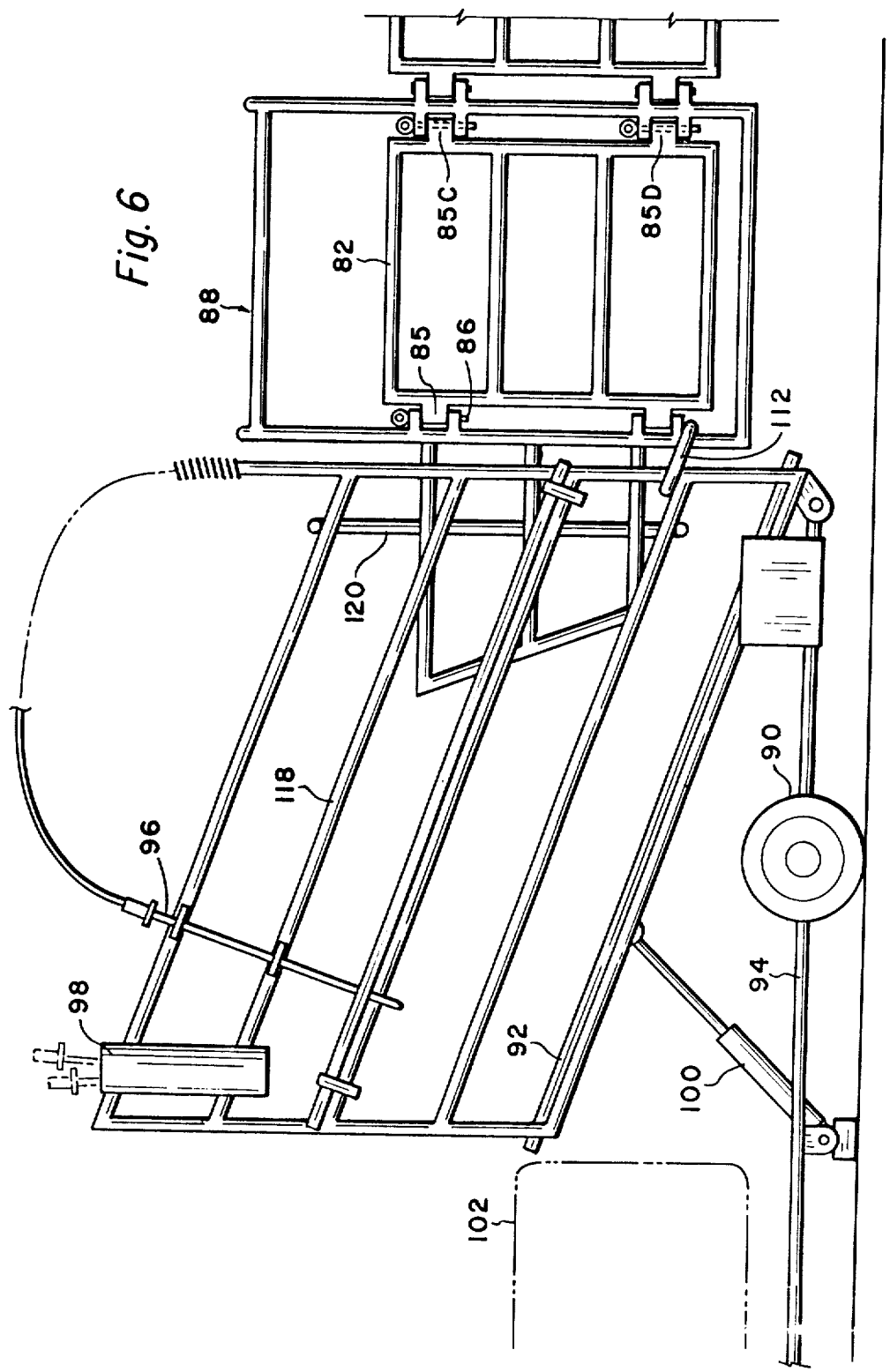

PORTABLE CORRAL

DISCLOSURE STATEMENT

A preliminary patentability search of the United States Patent and Trademark files discovered the following U.S. Pat. Nos.:
286,575; 880,665; 430,426; 2,228,946; 449,228; 3,702,600; 753,833; 4,034,716.

None of these patents disclose a portable carrier and loading chute such as described and claimed in the attached application. U.S. Pat. No. 753,833 to Copley shows a portable chute with panel extensions 27 which are hinged together and also hinged to the sides of the lower end portion of the parallel panel of the chute. These hinged panels are not on wheels and function entirely different than that of the portable cattle loader of the attached application. Various other patents show portable chutes and so forth.

BACKGROUND OF THE INVENTION

The field of the invention relates to portable loading chutes for loading and unloading cattle or other animals on and off trucks or the like.

Large herds of livestock and especially cattle graze on the pastures on ranches across this great country. The livestock and especially cattle may be moved from one ranch to another or from a ranch to the market place. These cattle are transported most often by use of cattle trucks. The cattle must be coaxed up a ramp or chute into the truck when loading and back down the chute when unloading. Frequently a permanent small corral is made in a portion of the pasture and the cattle are driven into the corral. Once in the corral the gates are closed and the cattle are then driven up a permanent chute into a truck which has been backed up against the chute. In some instances there are no permanent chutes and portable chutes have been devised. These portable chutes are hauled to a desired location usually in a pasture and set up. A truck is then backed up to the chute. These chutes are frequently set close to a fence so that the fence and the truck can help form a barrier to help drive the cattle onto the chute. This obviously has many drawbacks inasmuch as it is difficult to get the cattle to remain in a small area next to the chute so that they can be driven up the chute.

Therefore, it is an object of this invention to provide a portable loading chute with a portable fence or corral supported on wheels that can be drawn down a highway.

SUMMARY OF THE INVENTION

This is a portable loading chute and corral which is to be pulled behind a truck to the location which is desired to load cattle or other livestock. It includes a loading chute having two sides a ramp whose angle of inclination can be changed and two trailing fence sides. Each fence side is divided into two or more panel sections. These panel sections are pivotally attached together and each is provided with a wheel so that the two fence sides can be pulled down the road behind the chute with the two fence sides essentially parallel. Each wheel has a horizontal axis which is supported from a vertical rod supported from its respective panel or section. When pulled down the road the two fence sides are essentially parallel and close together and are approximately the same width as the width of the chute. Thus, it can be pulled down highways and other roads. The vertical wheel support rods are pivotally supported from the respective panel section and have limited pivotal motion. This is important for when it is desired to set up the chute and corral, the truck is stopped and then is backed up slightly which causes the wheels to rotate outwardly so that the two fence sides are spread apart making a storage pen or corral. Each panel section has a support panel which, when the fence sides are opened to their desired position, is merely pivoted out and an anchor pen is shoved into the ground. The rear panel sections are provided with guide panels to form a funnel like structure for herding the cattle into the enclosure and when the cattle are so guided in, the guide panels can be closed to form a gate.

In a preferred embodiment, between the chute and the trailing fence sides there is a diverting section. This diverting section is provided with swinging panels so that cattle can be driven directly up the loading chute or an animal can be placed in the diverting section and isolated from the chute and from the pen formed by the side fences and a side gate opened to let the animal out as may be desired.

It is therefore an object of this invention to provide a portable loading chute and corral which can be pulled down the highway and be used and can be rolled into corral position by backing up on the pulling vehicle.

It is still another object of this invention to provide a portable loading chute and trailing fence with a diverting section between the two so that animals can be diverted either up the chute or out the side.

BRIEF DESCRIPTION OF THE DRAWINGS

FIG. 1 is a top plan view showing a portable fence behind the portable loading chute with a diverting section between.

FIG. 3 is a view taken along the line 3—3 of FIG. 2.

FIG. 4 is a view taken along the line 4—4 of FIG. 2.

FIG. 5 is a view taken along the line 5—5 of FIG. 4.

FIG. 6 is similar to FIG. 3 except that the chute ramp has been raised to a selected inclination.

DETAILED DESCRIPTION

Figure 1:
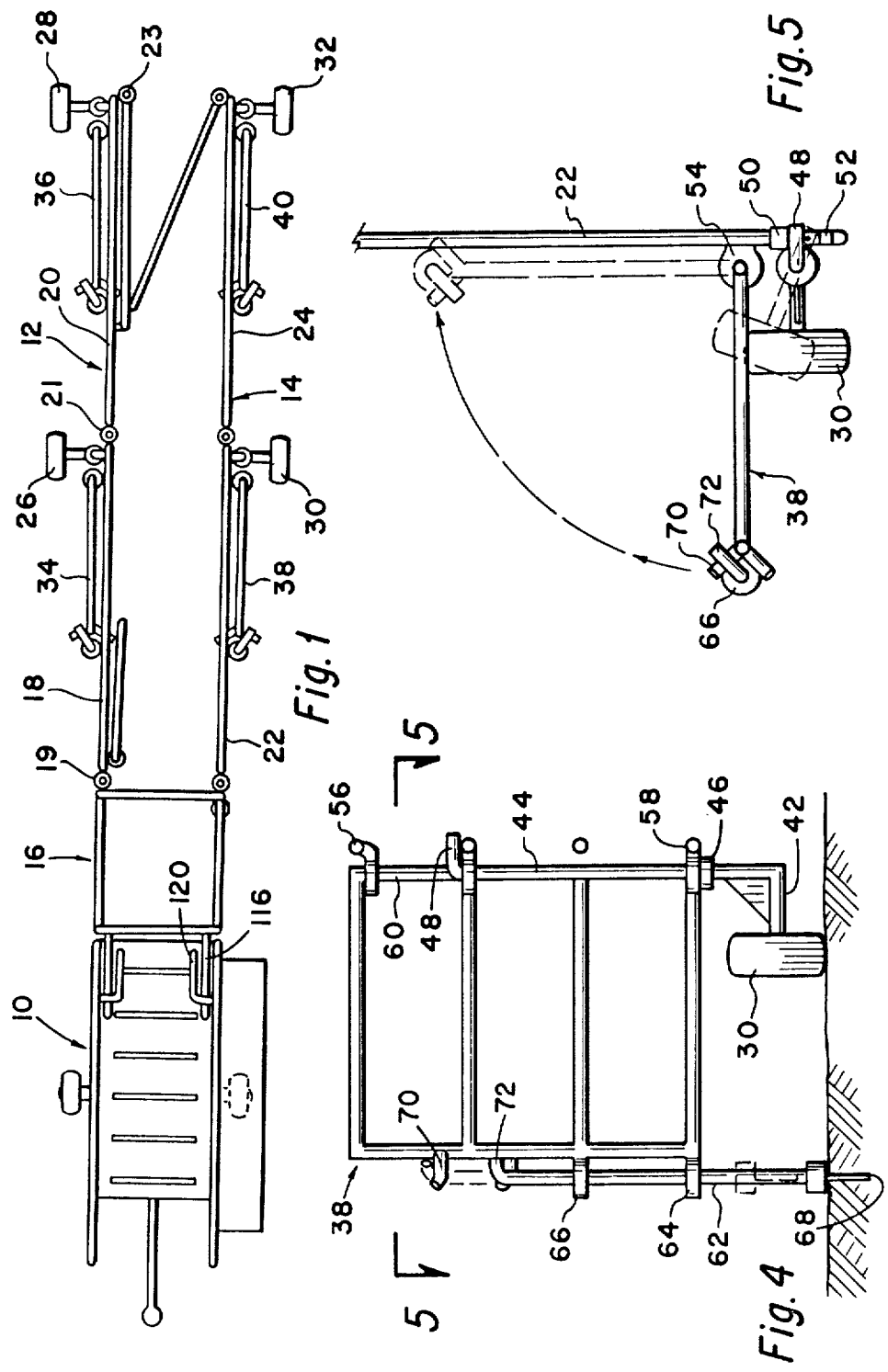

Attention is first directed to FIG. 1 which shows a top plan view of our portable loading chute and corral as it would appear when being pulled down the highway. Shown thereon is the loading chute 10 and the trailing corral which includes a side fence 12 and a second side fence 14. A diverting section 16 is between the side fences and the portable chute. Diverting section 16 is connected by vertical pivot 19 to panel section 18 which in turn is connected to panel section 20 by vertical pivot 21. Similar pivots are provided on fence side 14. These pivots can be simple vertical pin and housing type pivot. In the embodiment shown in FIG. 1 there are two panel sections with wheels for each side. This includes panel sections 18 and 20 on fence side 12 and panel sections 22 and 24 on fence side 24. Each of these panel sections is provided with wheels 26, 28, 30 and 32, respectively. Each panel section is provided with a support panel 34, 36, 38 and 40 respectively. When the chute and corral are being moved down a road the support panels are in the position shown in FIG. 1 and may be secured there by any desired means such as by straps. Between the portable chute 10 and the trailing fence sections 12 and 14 is a diverting section 16.

Figure 2:
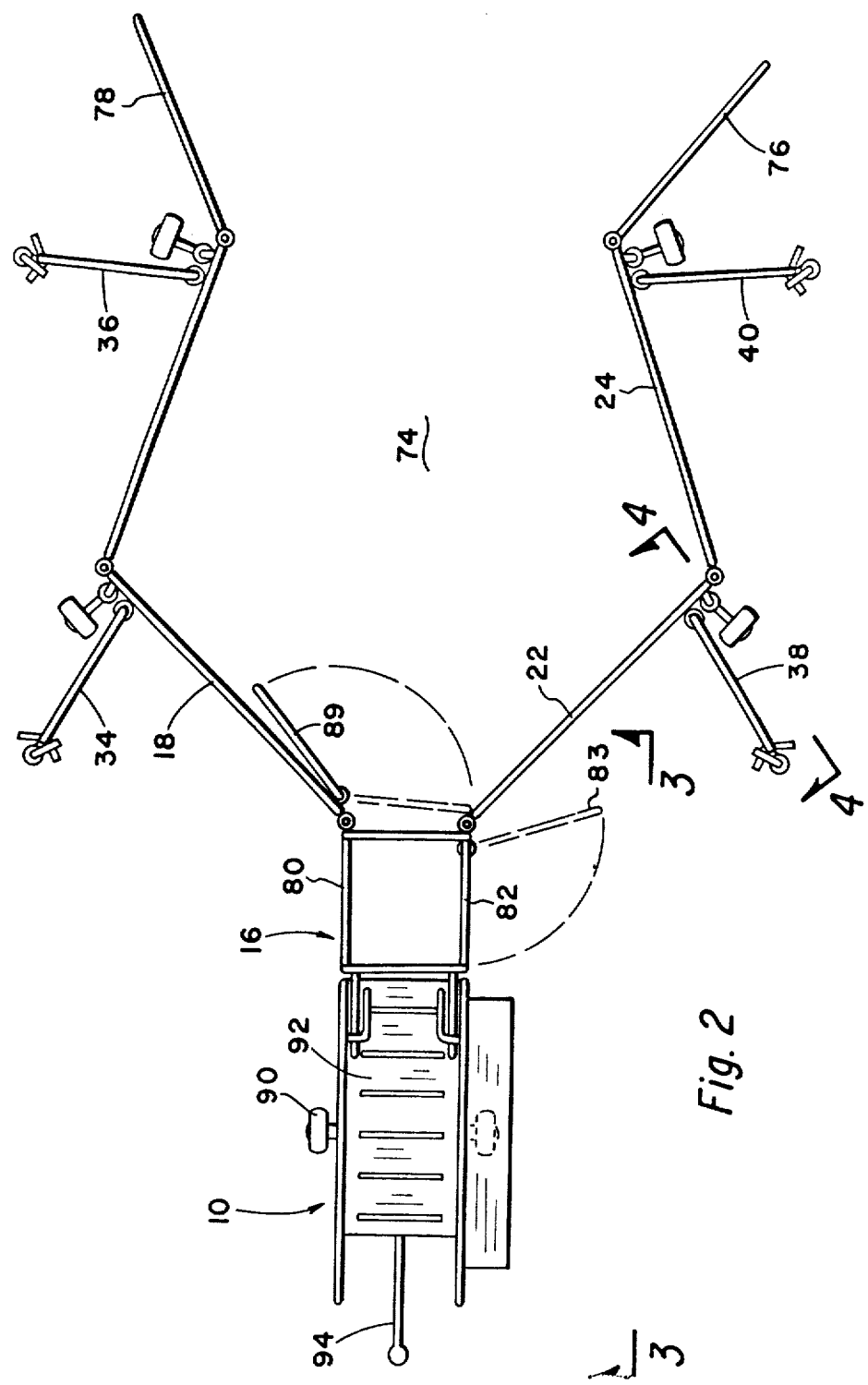
FIG. 2 is a top plan view similar to FIG. 1 except that the side fences have been moved outwardly thus forming a corral.

Attention is next directed to FIGS. 4 and 5. As shown in FIGS. 4 and 5, wheel 30 has a horizontal axis 42 which is connected to a vertical support rod 44 which extends upwardly through a bushing 46. The top of support rod 44 has a horizontal arm 48 which is shown in FIG. 5 limits the rotational movement of rod 44 in bushing 46 between first and second positions indicated by the solid line and the broken line. The rotational movement is limited by having arm 48 between upright post 58 and stop 52. When the trailing fence is pulled down the highway in the position shown in FIG. 1 the arm 48 is resting against post 50. When the portable loading chute and corral has reached its destination, it is desired to open it up as shown in FIG. 2. All that is necessary to accomplish this is to back up the truck which is pulling the portable chute. The wheels 26, 28, 30 and 32 will rotate slightly as indicated by the dotted line in FIG. 5, until the arm 48 contacts stop 52. This pivotal rotating is preferably limited to not over about 25°. Further backing of the truck will result in the fence being opened as shown in FIG. 2. When in this position, the support panels 34, 36, 38 and 40 which are supported from the panel sections are swung out. As shown in FIGS. 4 and 5 the support panel 38 is supported from panel section 22 by pivots 54, 56 and 58 which are essentially donut shaped structures with support panel rod 60 extending therethrough.

When it is desired to activate the support panels 34, 36, 38 and 40, one will swing the support panel out to the position shown in FIG. 2. Each is swung from its position shown in FIG. 5 by the dashed line to the solid line version. The outer end of support panel 38 is provided with a vertical support rod 62 which is supported from the panel by supports 64 and 66 which may be a support member with a hole therethrough through which the vertical support rod can be lowered to the position shown in FIG. 4 where the anchor pin 68 is forced into the ground. When it is desired to pivot the support panels back into the position shown in FIG. 1 the support rod 62 is raised to the position shown by the dotted line and the top horizontal arm 72 of vertical support rod 62 is supported over support bar 70 which is fixed to the panel 38. This is the position shown in the dashed line in FIG. 5 and also the position in which it would be when it is being pulled down the road. The other support panels are similarly equipped and operated. When cattle are herded into the area 74 as shown in FIG. 2, the guide panels 76 and 78 are in the position shown in FIG. 2. When the cattle are all herded into the area 74, then the panels 76 and 78 are brought together and secured forming a closed gate. When the cattle are all in the area 74 and the gate is closed, there is a tendency for them to rush each other and brush up against the side fences. That is the reason for the side support panels 34, 36, 38 and 40 so that the side fence will not be knocked down. The particular support panels shown are considered to be very sturdy and to give excellent support to the fences.

Once the cattle are in the area 74 and the panels 76 and 78 are secured then with my invention one has the option of moving the cattle into the chute or separating one at a time out through the diverter section 16. Diverter section 16 has side 80 which is normally always closed, but the other side 82 can operate as a gate and swing to the position 83 shown by the dashed line thus opening up a side of the diverter section 16. Section 18 is more clearly shown in FIG. 3 and includes four pin arms 85, 85B, 85C and 85D with a vertical pin 86, 86C and 86D extending through arms 85, 85C and 85D. In the position shown in FIG. 3, pin 86 is through arm 85 and serves as a latch of the device of the gate which is pivoted about pins 86C and 86D which acts as hinges. As is apparent from the description now, if one wishes to reverse the side from which the gate swings, all one has to do is take out pin 86D and place it in arm 85B so that the gate is hinged on the left side and the right side or the pin 86C becomes a gate fastener. The side 82 can be swung into the diverter section blocking the path of the ramp and opening the side. With the device as shown in FIG. 3 the pin 86 can be removed and the gate swung to the position shown in FIG. 2 by dashed line 83. A panel structure 88 is provided to give strength to the connection between the portable chute and the trailing fence. Diverter section 16 is also provided with a gate 89 which is supported from panel section 18. Thus, the diverter section can be isolated from the enclosure 74 by gate 89.

The front of the frame 88 is provided with a link 112 which connects and holds the front end to vertical member 114 of the chute. The front edge of the frame 88 of the diverter section is also provided with a frame 116 which extends between the outer bars 118 of the chute and inner holding bar 120. A similar connection is on the other side of the chute. This structure is useful when raising and lowering the ramp between the positions shown in FIG. 3 and in FIG. 6.

Attention is now directed to FIG. 3. The portable chute 10 has wheels 90, a loading ramp 92 and a tongue 94. When moving down the highway the loading ramp 92 is in the horizontal position as shown in FIG. 3. Various auxiliary equipment and accessories can be supported by the chute 10. This includes the normally used hot shot 96 and holder 98 which holds other accessories. The ramp has a hydraulically operated ram 100 which can be actuated to raise the loading ramp to the desired inclination so that its upper end will be on the level with the floor of the loading carrier 102. Various types of methods of systems can be used to raise and lower the inclination of the ramp. So that the raised end of the ramp is on the level with the truck or other carrier vehicle onto which the cattle are to be loaded. This raised position is shown in FIG. 6.

Figure 7:
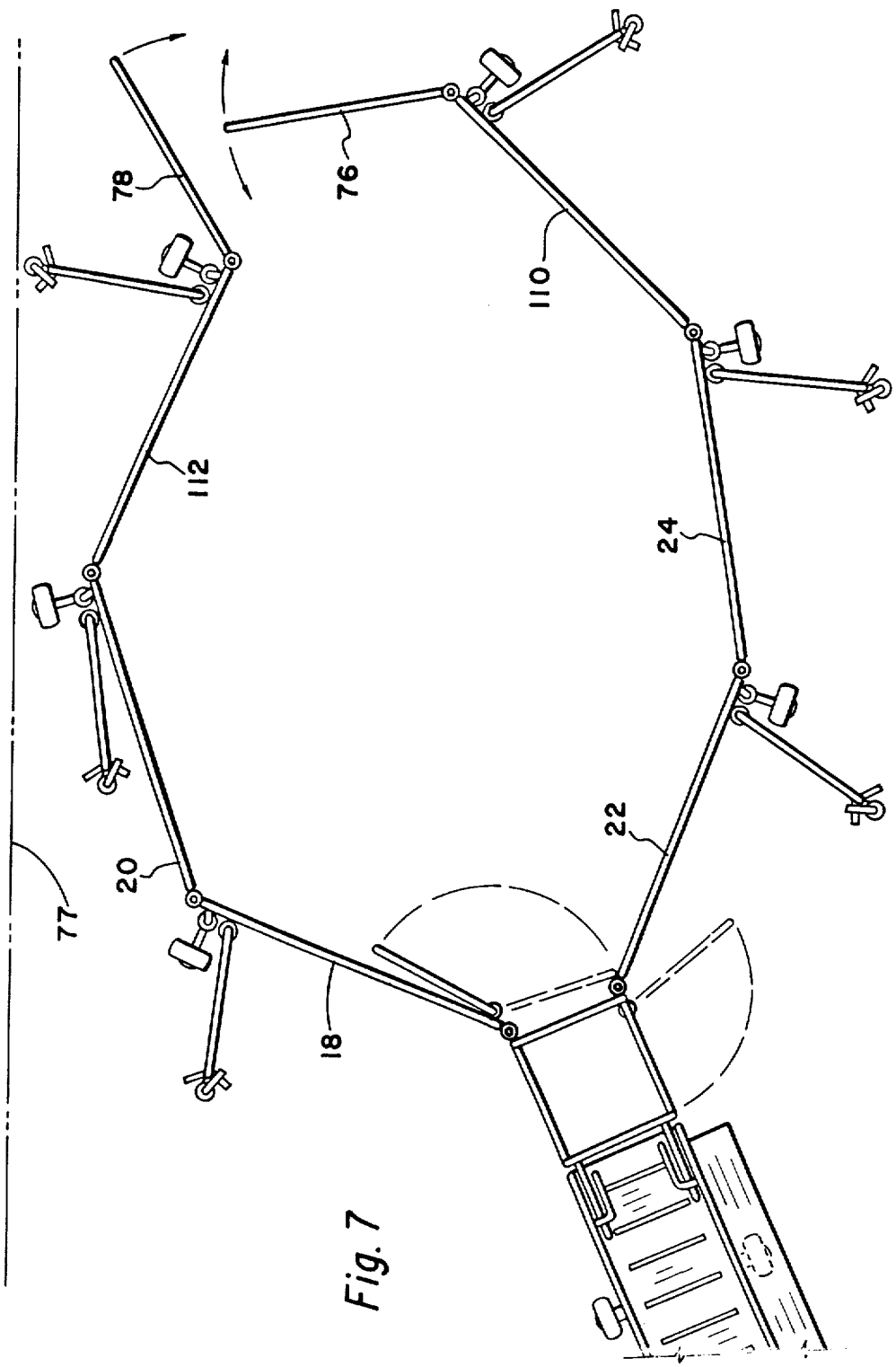
FIG. 7 is similar to FIG. 2 except that there are three panel sections per side.

Attention is next directed to FIG. 7 which is quite similar to FIG. 2 except that a third panel section 78 and a third panel section 110 have been added to the two fence sides. This also illustrates how the portable fence can be positioned near an existing fence 77 which is permanently placed along the edge of a pasture. The fence can be used to help direct the cattle into the open space between guide panel 78 and 76.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A portable loading chute and loading corral which comprises:

a loading chute with wheels supporting it;

a first side fence and a second side fence, each said side fence being composed of at least two panel sections, each supported by a wheel, the panel sections on each side fence being pivotally connected to each other;

a horizontal axis for each said wheel;

a vertical rod for each panel section, each vertical rod having a said wheel receiving horizontal axis extending therefrom;

means to support each said vertical rod from its respective panel section such that said vertical rod has limited rotational movement; and means to connect each said side fence to said chute.

2. A portable chute as defined in claim 1 including a diverter section positioned between said portable chute and said two side fences.

3. A potable loading rack as defined in claim 2 in which said diverter section includes a rectangular frame having two sides, one of said sides having a gate section.

4. A portable loading chute as defined in claim 3 including support panels supported from each said panel sections near the respective wheel thereon, each said support section having a rectangular frame pivotally supported at from its respective panel section, a vertical support rod vertically slidably mounted on the end of said support frame opposite said connection to said panel section, and an anchor pin at the lower end of the support rod for shoving into the ground; means to hold the vertical support rod in a position whereby said anchor pin is above the ground level.

5. A portable loading chute as defined in claim 1 in which said means to support includes a horizontal arm at the top of said vertical rod, a first stop and a second stop with said horizontal arm extending between said first stop and said second stop which are spaced such as to allow up to about 25° rotation of said vertical rod.

6. A portable loading chute and corral which comprises:

a portable chute mounted on wheels;

a first side fence and a second side fence, each said side fence being composed of at least two panel sections, each supported by a wheel, the panel sections on each fence being pivotally connected to each other; and a diverter section positioned between said portable chute and said two side fences, said diverter section including a rectangular frame having a first side and a second side, the first side having a gate section with two upright side edges, and including means whereby said front side may be pivoted from either of said upright side edges and the other side forming a fastener and said diverter section having a gate section which opens and closes the entry between said side fences into said diverter section.

7. A portable loading chute as defined in claim 6 in which said loading chute is provided with a ramp and means to change the inclination of said ramp.

* * * * *